BRACKET STANDARD AND PARTITION MEMBER RETAINER

Original Filed Nov. 5, 1970

Nels Nelsson
INVENTOR

Dana M. Schmidt
George E. Verhage
John K. Wise
ATTORNEYS

United States Patent

Re. 28,408
Reissued May 6, 1975

28,408

BRACKET STANDARD AND PARTITION MEMBER RETAINER

Nels Nelsson, Des Plaines, Ill., assignor to United States Gypsum Company, Chicago, Ill.

Original No. 3,685,234, dated Aug. 22, 1972, Ser. No. 87,035, Nov. 5, 1970. Appplication for reissue May 11, 1973, Ser. No. 359,366

Int. Cl. A47g *29/02;* E04b *2/72*

U.S. Cl. 52—36 6 Claims

Matter enclosed in heavy brackets [ ] appears in the original patent but forms no part of this reissue specification; matter printed in italics indicates the additions made by reissue.

ABSTRACT OF THE DISCLOSURE

A selectively mountable and demountable wall characterized by removable stud-mounted bracket standards which hold the partition members in place against the studs, the standards fitting flush against the exterior surface of the partition members.

BACKGROUND OF THE INVENTION

Conventional drywall constructions provide for the wall attachment of shelves and other heavy articles generally by the location of bracket standards in conjunction with the joint of two wallboards and the stud mounting these wallboards. This is necessitated by the inability of the wallboard to support a significant load directly, and also by the convenience and occasional necessity of mounting the wallboards so as to be removable or demountable without the brackets having been attached directly thereto. On the other hand, the strength and general permanence of the supporting web portion of the studs have permitted the standards to be structurally attached to and/or dependent thereupon, but only as articles which provide the sole function of supporting brackets. That is, the retention of the partition members has been accomplished by entirely different structure. Such stud-attached standards have been generally characterized as projecting outwardly away from the partition members as well as the stud a considerable distance, to permit the brackets to be inserted. Such projection away from the partion members' exterior surface, by its prominence, has detracted from the overall appearance of such walls. Further, such a standard is generally attached after the wall has been assembled. Such post-attachment may depend, for successful erection, upon accurate placement of the standard with respect to the now-covered studs. For example, it may be necessary to screw-attach the standard to the stud underneath the wallboard. Where considerable effort is made, as in many cases, to hide the joints on the finished wall assembly with a filler, the later accurate location of the studs may become a guessing game. If the joints are left exposed to permit ready location, the wallboard edge attachment means remains exposed in this conventional structure after the standard is attached, which is aesthetically undesirable.

A stud and standard has been designed heretofore to insure that the standard does not project outwardly from the wall surface. This generally has been accomplished, however, only by the use of a large number of components. For example, one construction requires, apart from the wallboard panels and shelf brackets, two studs, two separate bracket standards, two fillers, an S-shaped web, support channels for the studs, four metal edges for the wallboard panels, and four screws mounting the panels in place; in all 17 components. In the construction utilizing these parts, all but the screws and metal edges must be mounted between the two studs which are to support the four panels. Such a construction puts a premium on miniaturization, as the studs so joined must preferably have a minimum longitudinal extension. Such miniturization and a large collection of parts complicate the assembly, making it tedious, time consuming, and expensive at best.

In my copending application Ser. No. 79,580, filed on Oct. 9, 1970, there is disclosed a stud-standard combination which overcomes the afore-described problems. The combination specifically disclosed therein combines the standard with the stud to form an integral one-piece structure which entire structure mounts both the brackets and the partition members. Such a one-piece structure involves a completely new stud and requires, in all but one of the embodiments, a progressive assembly and disassembly of the partition members.

SUMMARY OF THE INVENTION

The disclosure relates to an improved bracket standard and stud combination wherein the standard is required to mount the partition members in place and yet can be removed from the stud to permit selective disassembly of any one of the partition members so mounted. The structure by which this is accomplished retains the conventional stud and yet permits a flush fit of the standard whereby the latter does not project outwardly beyond the surface of the partition member. Specifically, an improved wall assembly is provided having conventional studs and partition members mounted with respect to floor and ceiling runners, standards for supporting brackets, means for removably attaching the standards to the studs so that the standards project outwardly no farther than necessary to accommodated partition partition members between the standards and studs with the standards fitting flush against the members, and means on the standards for separating adjacent ones of the partition members to accommodated by a distance at least equal to the width of one of the brackets. By this construction, preferably only the standard holes adjacent partition members against the stud, the removability of the standard permitting a ready demounting of the wall. The construction further provides a method of assembly wherein one of the partition members is positioned against a side of a stud already in place, a standard is removably attached to the stud so as to abut against the partition member, and a second partition member is inserted to fit between the standard and the stud.

Accordingly, it is an object of the invention to provide an improved wall assembly and bracket standard used therewith which permit selective disassembly of the wall without requiring expensive, custom-made parts.

It is a further object of the invention to provide such structure which utilizes a minimum of wall-retaining parts.

Another object of the invention is to provide such structure which is decoratively appealing.

It is a related object of the invention to provide an improved method of assembly of the above-described structure which is simplified by the reduction of parts needed to assemble the wall.

Other objects and advantages will become apparent upon reference to the following drawings and detailed discussion.

DESCRIPTION OF THE PREFERRED EMBODIMENT

Figure 1:
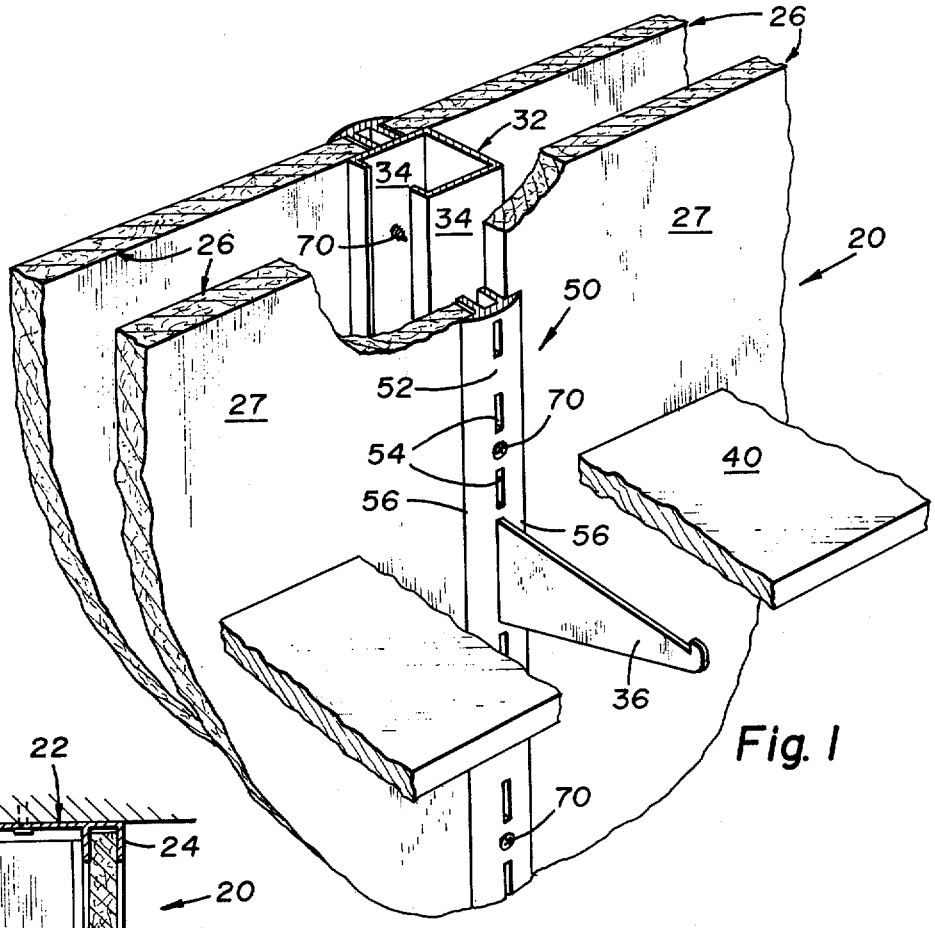
FIG. 1 is a fragmentary perspective view of a wall assembled in accordance with the invention.
Figure 2:
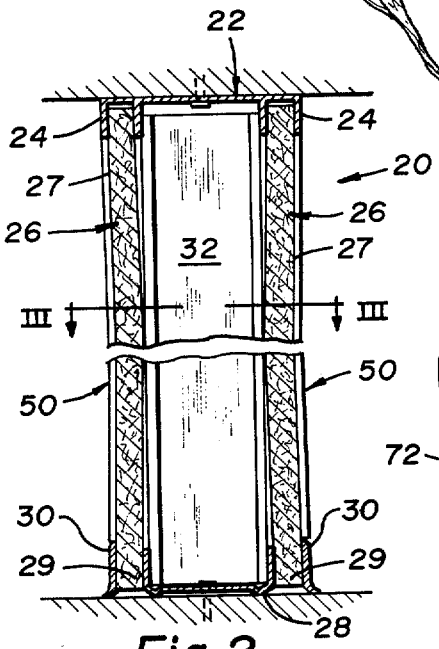
FIG. 2 is a fragmentary, sectioned elevational view of the wall of FIG. 1.

Referring to FIGS. 1 and 2, the demountable wall assembly 20 of the invention features conventional ceiling and floor runners 22 and 28, the former having two generally parallel track portions 24 adapted to removably engage partition members 26 therewithin. By "partition member," it is meant any drywall wallboard or the like, of any convenient type and size, but preferably two feet wide, laminated or unlaminated, a preferable form being paper and/or vinyl covered cast gypsum board the edges of which may or may not be reinforced. By the word "engage" and its other forms, it is meant [inter-relationship] *interrelationship* between two parts either of one of which, or both, are especially shaped or formed for that particular relationship.

The outwardly facing surface 27 of the board which is to be exposed when the wall is assembled may or may not have special decorative effects thereon.

The floor runner 28 conventionally abuts the bottom edges 29 of the wallboard 26. Because of structure hereafter described, it is not necessary to use screws which pass through both the runner and the bottom edges 29. However, base pieces 30 can be adhered to the bottom edges 29 as trim, the pieces preferably having the same length as the width of the wallboard units. The structural support of the partition members 26 is provided by studs 32. These are conventional metallic channels having side flanges 34 which removably abut the interior surfaces of the partition members 26, as explained hereafter. The studs 32 are conventionally removably mounted within the runners. Conventional brackets such as shelf brackets 36 are associated with the wall assembly 20 at the joints thereof for supporting loads such as shelves 40. It will be readily appreciated that brackets performing other functions, such as the mounting of cabinets, can also be used.

Figure 3:
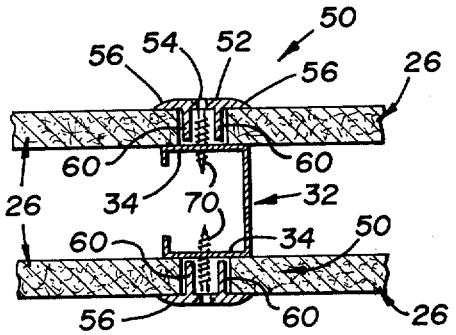
FIG. 3 is a fragmentary sectional view, taken along the line III—III of FIG. 2, the floor runner having been omitted for clarity.
Figure 4:
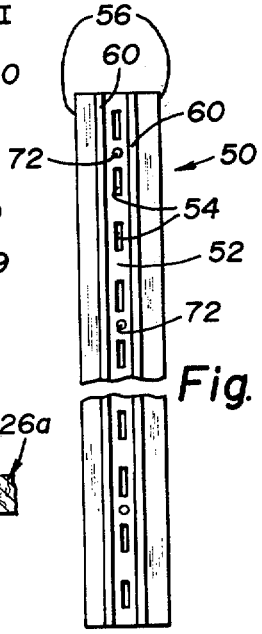
FIG. 4 is a fragmentary rear elevational view of the standard constructed in accordance with the invention and featured in the wall of FIGS. 1–3.

In accordance with one aspect of the invention, the brackets and the partition members 26 are both removably mounted adjacent to the studs 32 by standards 50. Turning now to FIGS. 1, 3 and 4, these standards comprise a flat perforated or slotted portion 52 characterized by slots 54 spaced therealong, the portion 52 being flanked by a flange 56 at each edge. The entire standard is characterized by a thickness which causes it to project outwardly from the stud a distance no greater than that necessary to fit flanges 56 flush against and hold the exterior surfaces 27 of the partition members. Thus the standards present a pleasing architectural appearance, while supporting the members 26 and the brackets 36 with respect to the stud 32.

In accordance with another aspect of the invention, to provide space for the brackets, a pair of legs 60 depend from the back surface of the flanges, the flotted portion 52 being positioned between the legs. The legs space the partition members apart sufficiently to *form an elongate slot therebetween, thus allowing* [allow] room for the engaged end of the bracket therebetween[, and accordingly]. *Accordingly,* the spacing of the legs need only be that which is sufficient to [accomodate] *accommodate* the brackets. The length of the legs must not exceed the thickness of the partition members, to insure the flush fit of the standard.

In accordance with yet another aspect of the invention, the standards 50, and therefore the brackets and the members 26, are removably held in place with respect to the stud, thus permitting selective disassembly or demounting of any partition member by simply removing the standards 50 adjacent to the partition to be demounted. Preferably, the standards are removably attached to the studs 32 by screws 70 which are inserted into holes 72 (FIG. 4) between the paired legs 60 so as to pass through only the standard and the stud.

Thus it will be apparent that, preferably, the partition members 26 and the brackets 36 are held abutted or adjacent to, respectively, the studs 32 by only the standards and the screws 70. Such construction reduces the number of parts necessary to mount the wall, thus reducing cost of manufacture and time of installation. Yet this system uses conventional studs in a manner which permits selective disassembly of the wall. The result is an inexpensive wall which is readily assembled and/or disassembled.

The above construction also permits a novel assembly of the wall in the following preferable progressive fashion. The studs are conventionally inserted within the runners, and a first partition member positioned within the runner 22 against the side flange of one of the studs. A standard is slipped over the vertical edge of the first partition with one flange fitting flush against the surface 27 thereof. Screws 70 are used to removably and loosely attach the standard to the stud in this position. Then a vertical edge of a second partition member is inserted between the side flange of the stud and the opposite flange of the standard so that the latter fits flush against the exterior surface 27 of that member. The first standard is then tighly secured to its stud. A second standard is slipped over the opposite vertical edge of the second partition member and attached to the next stud, and the process completed for the remainder of the wall.

It will be readily appreciated that the structure which permits the wall to be selectively disassembled will also permit selective assembly of individual members if such is desired.

Figure 5:
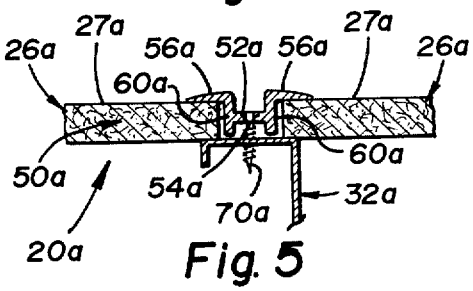
FIG. 5 is a fragmentary plan view, in section, similar to FIG. 3 but illustrating an alternate embodiment of the invention.

FIG. 5 illustrates an alternate embodiment of the invention wherein the standard is modified so as to partly conceal the slotted portion. Parts similar to those previously described bear the same reference numeral to which the distinguishing suffix a has been added. Thus, the wall assembly 20a features a conventional stud 32a against which are abutted two partition members 26a. As in the previous embodiment, the members are removably held in this abutted relationship by means of screws 70a and the standard 50a the flanges 56a of which are flush against the exterior surfaces 27a. The flanges 56a extend from a pair of legs 60a away from each other. Unlike the previous embodiment, the slotted portion 52a of the standard is recessed interiorly of the flanges, connecting and joining the legs 60a at a point on each which is intermediate their ends. The flanges thus partially hide the slots 54a from view.

Although the above embodiments feature partition members which are preferably 2 feet wide, wider ones are usable. If the members are 4 feet wide with studs 2 feet on center, the center of the back surface of each partition member is preferably glued to the stud located half-way between that member's edges, to enhance the support of the members.

Even though the invention has been described by reference to several preferred embodiments, it is not intended that it be limited thereto. Rather, it is intended that the invention cover all alternatives, equivalent arrangements, and embodiments as may be included within the scope of the following claims.

That which is claimed is:

[1. In a wall assembly having ceiling and floor runners, a plurality of studs removably mounted with respect to said runners, partition members abutted against said studs, brackets for supporting shelves and the like, standards for removably mounting the brackets with respect to said studs, and means for removably attaching the standards to the studs, the improvement comprising said standards projecting outwardly from said studs no farther than a distance which will accommodate the partition members between the studs and the standards with the latter fitting flush against the exterior surface of the members, said sandards including as means for separating adjacent ones of the partition members so accommodated by a distance at least equal to the width of one of the brackets, a pair of legs the length of which is less than the thickness of said accommodated adjacent members.]

2. The [improved] assembly as defined in claim [1] *8* wherein said attaching means passes through each standard between the individual members of said [pair of] legs.

3. The [improved] assembly as defined in claim [1] *8,* wherein each of the standards includes at least one flange which abuts [flush] against the exterior surface of at least one of [a pair of] the partition members.

4. The [improved] assembly as defined in claim 3, wherein said standard includes a slotted portion, and two flange portions abutting said exterior surfaces, said slotted portion being recessed interiorly of the flange portions, whereby the slotted portion is partially hidden from view by the flange portions.

5. The [improved] assembly as defined in claim 3, and further including in each of the standards a second flange abutted against the exterior of one of the members and a relatively flat portion extending between said flanges, said flat portion having slots therethrough spaced along substantially its entire length.

6. The [improved] assembly as defined in claim 5, *and further including two* [wherein said] legs [depend] *depending* from said flanges with said slots therebetween.

[7. The improved assembly as defined in claim 5, wherein said attaching means penetrates only said flat portion and said stud.]

*8. A wall assembly comprising*

*upper and lower runners disposed in spaced-apart relationship from one another generally in the same plane,*

*a plurality of studs extending between said runners with respective ends thereof engaging said runners, said studs having surfaces for supporting partition members,*

*a plurality of partition members mounted in adjoining edge-to-edge relationship on the supporting surfaces of said studs, the adjacent edge surfaces of adjacent partition members being spaced apart from each other so as to define, in combination with one of said supporting surfaces of one of said studs, an elongate slot,*

*a plurality of bracket standards, each of said bracket standards contacting two adjacent edges of said partition members,*

*attachment means securing each of said bracket standards to one of said studs whereby said bracket standards hold said partition members in contact with said supporting surface of said studs, and*

*a plurality of shelf brackets removably engaging said standards by extension of a portion of said shelf bracket through said standard and into said elongate slot,*

*wherein said standard includes two legs extending therefrom between said adjacent edge surfaces toward said stud surface, said legs being of a length no greater than that necessary to permit said bracket standard to contact said two adjacent edges of said partition members, whereby said legs separate said adjacent edge surfaces by a distance sufficient to form said elongate slot, and*

*integral means engaging and restraining the face surfaces of adjoining partition members.*

References Cited

The following references, cited by the Examiner, are of record in the patented file of this patent or the original patent.

UNITED STATES PATENTS

| | | | |
|---|---|---|---|
| 2,796,158 | 6/1957 | Miles et al. | 248—243 X |
| 3,066,774 | 12/1962 | Dahme | 108—108 X |
| 3,174,592 | 7/1965 | Berman et al. | 52—36 X |
| 3,193,885 | 7/1965 | Gartner et al. | 108—108 X |
| 3,685,234 | 8/1972 | Nelsson | 52—36 |

PRICE C. FAW, Jr., Primary Examiner

U.S. Cl. X.R.

52—241, 468, 489; 108—108; 248—243